US009508999B2

(12) United States Patent
Darling et al.

(10) Patent No.: US 9,508,999 B2
(45) Date of Patent: Nov. 29, 2016

(54) WICKING LAYER FOR MANAGING MOISTURE DISTRIBUTION IN A FUEL CELL

(71) Applicant: Audi AG, Ingolstadt (DE)

(72) Inventors: Robert Mason Darling, South Windsore, CT (US); Paravastu Badrinarayanan, Waltham, MA (US)

(73) Assignee: Audi AG, Ingolstadt (DE)

( * ) Notice: Subject to any disclaimer, the term of this patent is extended or adjusted under 35 U.S.C. 154(b) by 505 days.

(21) Appl. No.: 14/051,591

(22) Filed: Oct. 11, 2013

(65) Prior Publication Data
US 2014/0087277 A1    Mar. 27, 2014

Related U.S. Application Data

(63) Continuation of application No. 12/920,609, filed as application No. PCT/US2008/061358 on Apr. 24, 2008, now abandoned.

(51) Int. Cl.
H01M 8/04    (2016.01)
H01M 8/02    (2016.01)

(52) U.S. Cl.
CPC ....... *H01M 8/04149* (2013.01); *H01M 8/0267* (2013.01); *H01M 8/04171* (2013.01); *H01M 8/04291* (2013.01); *H01M 8/0258* (2013.01); *Y02E 60/50* (2013.01)

(58) Field of Classification Search
CPC .......... H01M 8/0245; H01M 8/0267; H01M 8/04149; H01M 8/04171
See application file for complete search history.

(56) References Cited

U.S. PATENT DOCUMENTS

| 2004/0229093 A1 | 11/2004 | Nakianishi et al. |
| 2005/0181264 A1 | 8/2005 | Gu et al. |
| 2006/0199061 A1 | 9/2006 | Fiebig et al. |
| 2006/0286436 A1 | 12/2006 | Faghri et al. |
| 2007/0054175 A1* | 3/2007 | Maendle ............. H01M 4/8626 429/482 |
| 2007/0099060 A1 | 5/2007 | Lee et al. |
| 2007/0254201 A1 | 11/2007 | Shu et al. |

(Continued)

FOREIGN PATENT DOCUMENTS

| JP | 08130025 | 5/1996 |
| JP | 2005-116179 | 4/2005 |
| WO | 2008082407 A1 | 7/2008 |

OTHER PUBLICATIONS

International Preliminary Report on Patentability for International Application No. PCT/US2008/061358 mailed Nov. 4, 2010.

(Continued)

*Primary Examiner* — Ula C Ruddock
*Assistant Examiner* — Amanda Barrow
(74) *Attorney, Agent, or Firm* — Seed IP Law Group LLP

(57) ABSTRACT

An exemplary device for managing moisture content within a fuel cell includes a reactant distribution plate having a plurality of members that establish reactant flow channels that are open on at least one side of the plate. A wicking layer is against the one side of the plate. The wicking layer includes a first portion that is uninterrupted and covers over at least some of the channels. A second portion of the wicking layer extends along ends of at least some of the members such that sections of the channels coextensive with the second portion are open toward the one side.

20 Claims, 2 Drawing Sheets

(56) References Cited

U.S. PATENT DOCUMENTS

2008/0032169 A1* 2/2008 Fabian .................. H01M 8/023
  429/414
2009/0029220 A1* 1/2009 Yoshizawa .......... H01M 4/8605
  429/528

OTHER PUBLICATIONS

International Search Report and Written Opinion of the International Searching Authority for International Application No. PCT/US2008/061358 mailed Oct. 31, 2008.

* cited by examiner

WICKING LAYER FOR MANAGING MOISTURE DISTRIBUTION IN A FUEL CELL

BACKGROUND

A variety of fuel cell configurations are known. Many fuel cells have a polymer electrolyte membrane (PEM) between catalyst layers where electrochemical reactions occur for generating electricity. There are different types of PEM fuel cells. Some have solid reactant distribution flow field plates associated with each of the catalyst layers. Existing solid reactant distribution plates are made from metal or a carbon composite, for example.

One issue associated with PEM fuel cells that include solid reactant distribution plates is that there is a possibility for damage to one or more fuel cell components as a result of dry out. This issue is particularly prevalent near the fuel and air inlets of a fuel cell stack assembly. Incomplete saturation of the gas streams at the inlets presents an increased possibility for dry out of fuel cell components in that area.

There is a need for an economical and effective approach to minimize dry out in a fuel cell. This invention addresses that need.

SUMMARY

An exemplary device for managing moisture content within a fuel cell includes a reactant distribution plate having a plurality of members that establish reactant flow channels that are open on at least one side of the plate. A wicking layer is against the one side of the plate. The wicking layer includes a first portion that is uninterrupted and covers over at least some of the channels in an area that may be referred to as the condensation zone. A second portion of the wicking layer extends along ends of at least some of the members such that sections of the channels coextensive with the second portion are open toward the one side. The open channels allow reactant gas transport to catalyst layers.

An exemplary method of managing moisture distribution within a fuel cell assembly includes positioning a wicking layer between a reactant distribution plate and a gas diffusion layer. A portion of at least some gas flow channels in the reactant distribution plate are covered with a first portion of the wicking layer. Other portions of the gas flow channels are left exposed and open along a second portion of the wicking layer.

The various features and advantages of the disclosed examples will become apparent to those skilled in the art from the following detailed description. The drawings that accompany the detailed description can be briefly described as follows.

DETAILED DESCRIPTION

Disclosed examples include a wicking layer that is useful for managing moisture content within a fuel cell. In the disclosed examples, the wicking layer is useful for absorbing liquid water while a fuel cell operates, for example, and transporting or wicking the liquid water toward dry parts of a fuel cell.

Figure 1:
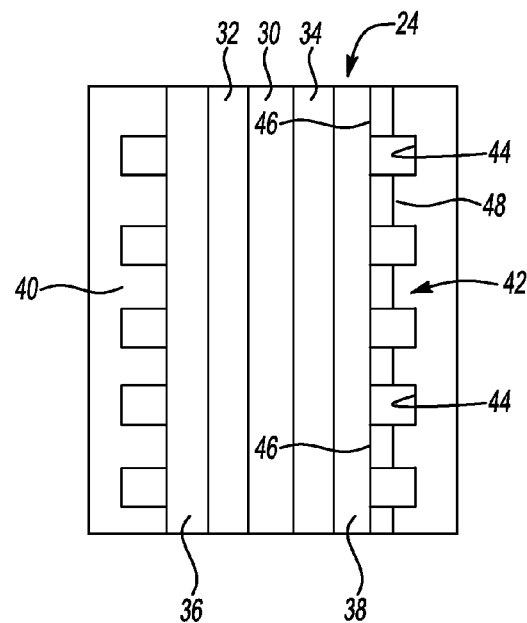
FIG. 1 schematically illustrates a fuel cell assembly designed according to an embodiment of this invention.

FIG. 1 schematically shows selected portions of an example fuel cell assembly 24 that includes a polymer electrolyte membrane 30 between catalyst layers 32 and 34. In one example, the catalyst layer 34 is a cathode layer while the catalyst layer 32 is an anode layer. A gas diffusion layer 36 is on an opposite side of the catalyst layer 32 from the polymer electrolyte membrane 30. Similarly, a gas diffusion layer 38 is adjacent the catalyst layer 34.

Reactant distribution plates 40 and 42 are adjacent the gas diffusion layers 36 and 38. In one example, the reactant distribution plates 40 and 42 comprise solid plates, which have at least one solid layer that is not porous. In one example, at least one of the reactant distribution plates comprises metal. In another example, at least one of the reactant distribution plates comprises a carbon composite material.

In the example of FIG. 1, the reactant distribution plate 42 includes a plurality of channels 44 that allow for air flow in a known manner. The reactant distribution plate 42 includes a plurality of members 48 that establish the channels 44. In this example, the members 48 comprise ribs that have a length essentially consistent with one of the lateral dimensions of the reactant distribution plate 42 as can be appreciated from the drawing, for example.

A wicking layer 46 is positioned between the reactant distribution plate 42 and the gas diffusion layer 38. The wicking layer 46 in this example is electrically conductive. One example wicking layer 46 comprises hydrophilic carbon. In another example, the wicking layer 46 comprises a tin oxide treated TORAY (e.g., carbon fiber) paper.

Figure 2:
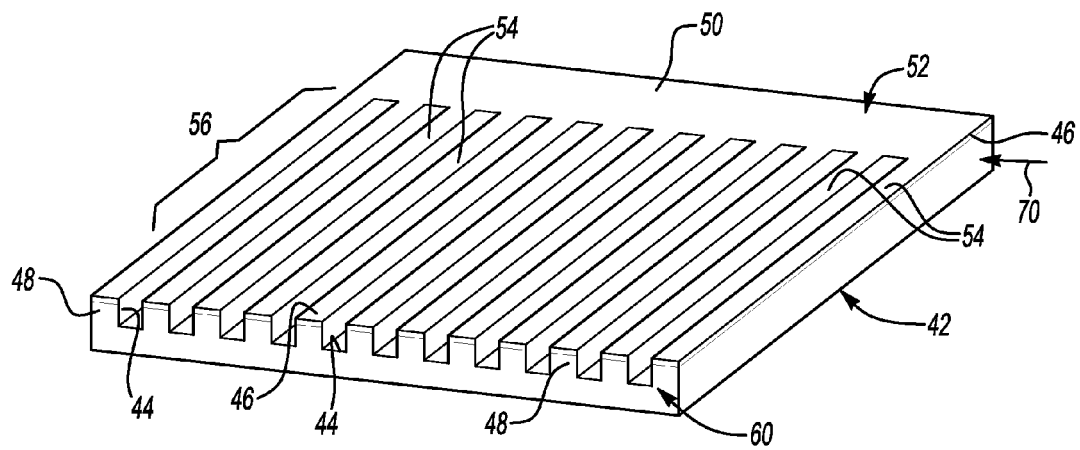
FIG. 2 schematically illustrates an example wicking layer configuration.

One example configuration of the wicking layer 46 is shown in FIG. 2. The wicking layer 46 in this example has a first portion 50 that is essentially coextensive and extends across an entire width (e.g., from side to side in the drawing) of the reactant distribution plate 42. The first portion 50 covers over a condensation zone 52 of the reactant distribution plate 42. The first portion 50 in this example covers over the channels 44 in the condensation zone 52. The first portion 50 in this example is a continuous, uninterrupted sheet of the material chosen for the wicking layer 46.

A second portion 54 of the wicking layer 46 comprises separated or spaced sections that are essentially coextensive with ends of the members 48 (e.g., ribs) without covering any of the channels 44. The second portion 54 of the wicking layer 46 is that which is visible in FIG. 1. The sections of the second portion 54 are positioned along ends of the members 48 such that the wicking layer 46 does not cover or hinder the air channels 44 at that location. Such an arrangement prevents the wicking layer 46 from interfering with gas access to the catalyst layer at least along an active zone 56 of the channels 44. The active zone 56 of the reactant distribution plate 42 is the zone along the length of the channels 44 where the electrochemical reaction involving gas access to the catalyst layer takes place. The wicking layer 46 is configured this way in the active zone to allow reactant access to the catalyst layer as needed for efficient fuel cell operation.

The condensation zone 52 may be part of the active zone 56. In such examples, the first portion 50 of the wicking layer 46 may partially cover the active zone 56 where the condensation zone exists. Alternatively, the second portion 54 of the wicking layer extends over the entire active region including the portion of the condensation zone that is within the active zone 56.

The second portion 54 differs from the first portion 50 in that the second portion 54 is not continuous and is interrupted when viewed in a direction across the width of the reactant distribution plate 42 (e.g., when viewed in a direction transverse to a direction of airflow through the channels 44). Having a continuous first section 50 in the condensation zone 52 and the interrupted second portion 54 in the active zone increases an amount of moisture distribution along the wicking layer 46 while avoiding interference with gas access to the catalyst layer.

The example wicking layer 46 is configured to carry moisture (e.g., water) from the condensation zone 52 to an air inlet side 60 of the distribution plate 42. As known, air that is supplied to the catalyst side reactant distribution plate 46 is dry. The air exiting the channels 44 at the side of the reactant distribution plate including the condensation zone 52 generally contains higher concentrations of moisture compared to the air at the inlet. The lack of moisture at the inlet can tend to dry out the corresponding portions of at least the reactant distribution plate 42.

The condensation zone is called that because it is where moisture in the exiting air flow is condensed and removed from the gas stream as liquid water. The wicking layer 46 is arranged to transport such water toward the air inlet side 60 of the reactant distribution plate 42. The first portion 50 extends across essentially the entire condensation zone to increase or maximize the amount of water transport through the wicking layer 46 toward the air inlet side 60 of the reactant distribution plate 42.

Figure 3:
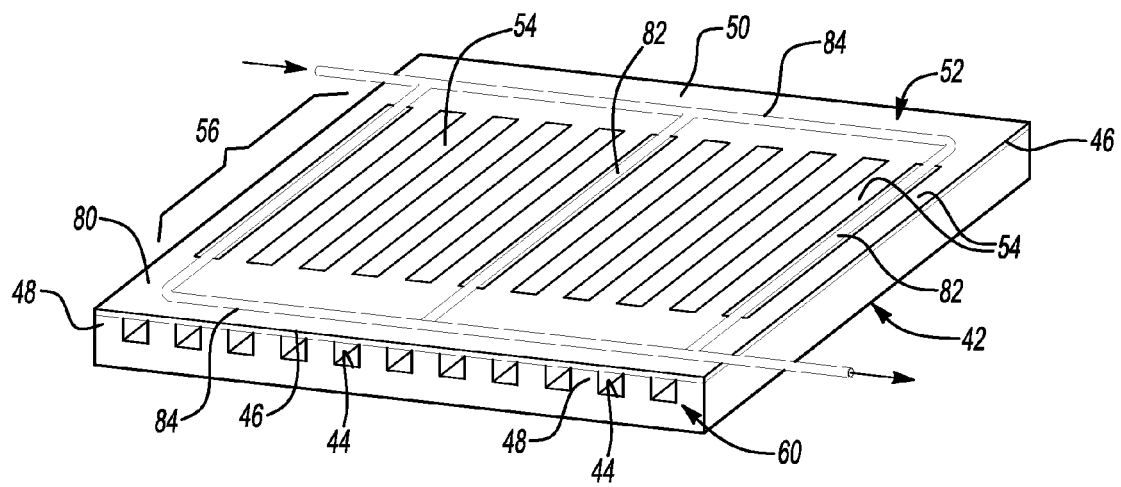
FIG. 3 schematically illustrates another example wicking layer configuration.
Figure 4:
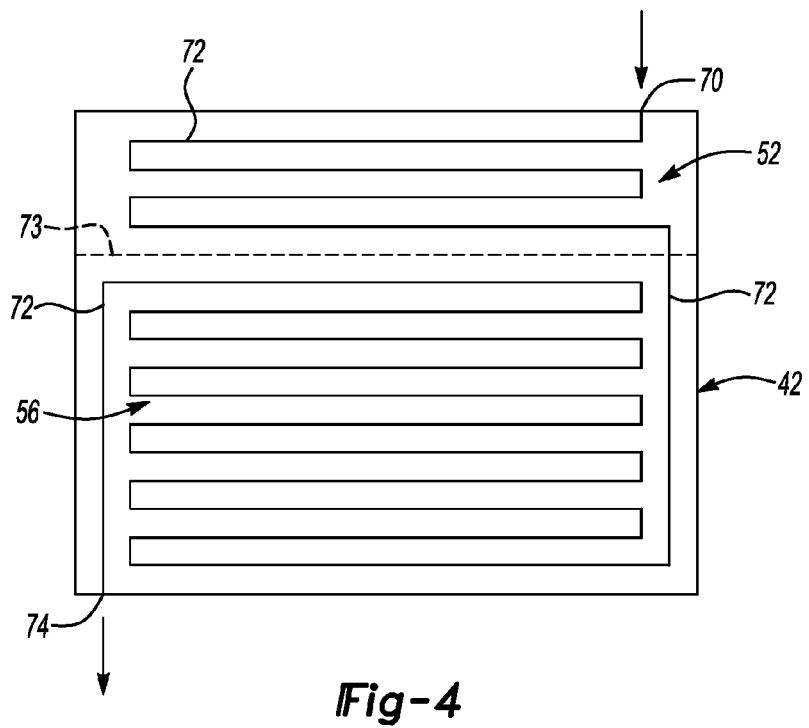
FIG. 4 schematically shows an example coolant channel configuration.

As shown in FIG. 4, the illustrated example includes a coolant inlet 70 and coolant flow channels 72 arranged to cool the exiting air to promote condensation. In this example, the coolant inlet 70 is used to introduce coolant typically below 65 degrees Celsius into the cell. The coolant flow channels 72 are separate from the air flow channels 44. The coolant channels 72 are below the airflow channels 44 in the views of FIGS. 2 and 3.

The coolant flow channels 72 in this example begin in the condensation zone 52, then direct coolant under the air inlet side 60 to cool the dry, incoming air. The coolant channels then wind under the active zone 56 and exit near the interface 73 between the condensation zone 52 and the active zone 56. The coolant outlet is shown at 74.

The movement of the water along the wicking layer 46 occurs as a result of hydraulic pressure gradients in the cell. One example includes a configuration designed to minimize a pressure difference between the inlet side 60 and the outlet side near the condensation zone 52 because the wicking action of the wicking layer 46 cannot act against too great a pressure difference. One example includes a single pass air flow arrangement in which the air channels 44 take the shortest path across the active zone 56. The path length of the channels 44 is practically minimized by designing the cell with a high aspect ratio in order to reduce the pressure drops in the gas and liquid phases. In one example, the required area of the active zone 56 is 200 $cm^2$, the channels are 71 mm long and the active zone is 283 mm wide. Such an example minimizes pressure drop and facilitates sufficient wicking action (e.g., water transport from the condensation zone 52 toward the inlet side 60).

Another example wicking layer 46 is shown in FIG. 3. In this example, the wicking layer 46 includes a first portion 50 and a second portion 54 like those in the example of FIG. 2. In this example, however, the end of the wicking layer 46 that is distal from the first portion 50 comprises a third portion 80. In this example, the third portion 80 is a continuous, uninterrupted sheet of wicking layer material that covers over the channels 44. The active zone 56 still includes uncovered channels 44 that allow the gas in the channels 44 to access the catalyst layer.

In the example of FIG. 3, fuel flow channels 82 are arranged to provide a direction of fuel flow that is opposite a direction of air flow in the channels 44. Directing fuel flow in this direction can maximize the exchange of water across the membrane. In this example, fuel distribution channels 84 are positioned over the inactive regions near the air inlet side 60 and the outlet side near the condensation zone 52. The wicking layer first portion 50 and third portion 80 in the example of FIG. 3 are in the corresponding inactive regions.

In some examples, a perimeter of the wicking layer 46 is sealed to prevent water from leaking out of an area where moisture distribution is desired. One such example includes bonding the perimeter of the wicking layer to the reactant distribution plate 42 to accomplish the desired seal.

One feature of the example wicking layers 46 is that they utilize hydraulic pressure to distribute water within the cell without requiring a separate humidification device.

The example wicking layers 46 may have smaller pores compared to pores in the gas diffusion layer 38. The pores in the wicking layer 46 are more hydrophilic than the pores in the gas diffusion layer 38. This facilitates the wicking layer 46 drawing water out of the gas diffusion layer 38. One feature of such an arrangement is that it increases oxygen diffusion into the electrode.

The example wicking layers 46 described above are located between the reactant distribution plate 42 and the gas diffusion layer 38 on the cathode side of the example cell. More water is typically generated on the cathode side. The example wicking layers 46 may also be used on the anode side of a cell.

The preceding description is exemplary rather than limiting in nature. Variations and modifications to the disclosed examples may become apparent to those skilled in the art that do not necessarily depart from the essence of this invention. The scope of legal protection can only be determined by studying the following claims.

We claim:

1. A device for managing moisture content within a fuel cell, comprising:
   a reactant distribution plate having a plurality of members that establish reactant flow channels that are open on at least one side of the plate;
   a wicking layer against the one side of the plate, the wicking layer including
      a first portion that is uninterrupted across at least some of the channels such that the first portion covers over the at least some of the channels, and
      a second portion that extends along ends of at least some of the members without covering sections of the channels coextensive with the second portion of the wicking layer such that the sections of the channels are open toward the one side; and
   a plurality of fuel channels including at least one fuel flow channel aligned with at least one of the channels and a fuel distribution channel aligned with the first portion of the wicking layer, the fuel distribution channel being at least partially generally perpendicular to the fuel flow channel.

2. The device of claim 1, wherein the wicking layer is positioned between the reactant distribution plate and the fuel channels.

3. The device of claim 1, wherein
the wicking layer comprises a third portion that is uninterrupted and covers over at least some of the channels of the reactant distribution plate;
the first and third portions are near opposite ends of the second portion; and
the device comprises a second fuel distribution channel aligned with the third portion of the wicking layer.

4. The device of claim 1, wherein the first portion of the wicking layer is generally coextensive with a condensation zone of the reactant distribution plate.

5. The device of claim 4, wherein the second portion of the wicking layer is positioned along an electrochemically active zone of the reactant distribution plate.

6. The device of claim 4, comprising at least one coolant flow channel on a second side of the reactant distribution plate that is opposite the one side, the at least one coolant flow channel having an inlet near the first portion of the wicking layer, the inlet establishing the condensation zone.

7. The device of claim 6, wherein
the at least one coolant flow channel includes a plurality of coolant passages oriented generally perpendicular to the reactant flow channels;
some of the coolant passages are situated on the second side of the reactant distribution plate aligned with the first portion of the wicking layer.

8. The device of claim 7, wherein the at least one coolant flow channel directs coolant along the reactant distribution plate near opposite ends of the reactant distribution plate before directing coolant along the reactant distribution plate in an area that is aligned with the second portion of the wicking layer.

9. The device of claim 7, wherein the at least one coolant flow channel directs coolant back and forth across the plate near one end of the plate progressively in a downstream direction then directly in the downstream direction toward an opposite end of the plate then back and forth across the plate progressively in an upstream direction toward the one end of the plate then directly in the downstream direction toward the opposite end of the plate.

10. The device of claim 9, wherein
a portion of the at least one coolant flow channel that directs the coolant back and forth across the plate near the one end of the plate progressively in the downstream direction is aligned with the first portion of the wicking layer; and
another portion of the at least one coolant flow channel that directs the coolant back and forth across the plate progressively in the upstream direction is aligned with the second portion of the wicking layer.

11. The device of claim 1, wherein the wicking layer comprises a hydrophilic carbon.

12. A device for managing moisture content within a fuel cell, comprising:
a reactant distribution plate having a plurality of members that establish reactant flow channels that are open on at least one side of the plate, the reactant flow channels having lengths along the one side of the plate, the lengths establishing a direction of reactant flow along the channels between opposite ends of the plate;
a wicking layer against the one side of the plate, the wicking layer including a first portion covering over a first section of the length of at least some of the channels and a second portion corresponding to a second section of the length of the at least some of the channels, the second portion of the wicking layer covering corresponding sections of at least some of the members and leaving the second section of the length of the at the least some of the channels uncovered by the wicking layer; and
at least one coolant flow channel on a second side of the reactant distribution plate that is opposite the one side, the at least one coolant flow channel including a plurality of coolant passages oriented generally perpendicular to the reactant flow channels, some of the coolant passages being situated on the second side of the reactant distribution plate aligned with the first portion of the wicking layer, others of the coolant passages being aligned with the second portion of the wicking layer, the some of the coolant passages being between an inlet to the at least one coolant flow channel and the others of the coolant passages.

13. The device of claim 12, wherein the some of the coolant passages direct coolant back and forth across the plate near one end of the plate progressively in a downstream direction; and
the others of the coolant passages direct coolant back and forth across the plate progressively in an upstream direction toward the one end of the plate.

14. The device of claim 12, wherein the wicking layer comprises a hydrophilic carbon.

15. The device of claim 12, wherein
the members have a surface on the one side of the plate;
the first and second portions of the wicking layer are situated against the surfaces of the members; and
the first portion of the wicking layer is spaced from a surface of the channels that faces the one side of the plate.

16. The device of claim 15, wherein
the members have a width and a length along the one side;
the length of the members is coextensive with the length of the channels;
the width of the members is perpendicular to the length of the members; and
the second portion of the wicking layer has sections with a width that corresponds to the width of corresponding sections of the members.

17. The device of claim 12, comprising a plurality of fuel channels including at least one fuel flow channel aligned with at least one of the channels and a fuel distribution channel aligned with the first portion of the wicking layer, the fuel distribution channel being at least partially generally perpendicular to the fuel flow channel.

18. The device of claim 17, wherein the wicking layer is positioned between the reactant distribution plate and the fuel channels.

19. The device of claim 17, wherein
the wicking layer comprises a third portion that is uninterrupted and covers over at least some of the channels of the reactant distribution plate;
the first and third portions are near opposite ends of the second portion; and
the device comprises a second fuel distribution channel aligned with the third portion of the wicking layer.

20. The device of claim 12, wherein
the wicking layer comprises a third portion that is uninterrupted and covers over a third second of the length of at least some of the channels of the reactant distribution plate; and
the second portion of the wicking layer is between the first portion and the third portion.

* * * * *